(12) United States Patent
Zheng et al.

(10) Patent No.: US 11,385,737 B1
(45) Date of Patent: Jul. 12, 2022

(54) ELECTRONIC DEVICE

(71) Applicant: TPK Touch Systems (Xiamen) Inc., Fujian (CN)

(72) Inventors: Junjie Zheng, Quanzhou (CN); Yanjun Xie, Xiamen (CN); Junping Yang, Longhai (CN)

(73) Assignee: TPK Touch Systems (Xiamen) Inc., Xiamen (CN)

( * ) Notice: Subject to any disclaimer, the term of this patent is extended or adjusted under 35 U.S.C. 154(b) by 0 days.

(21) Appl. No.: 17/229,262

(22) Filed: Apr. 13, 2021

(51) Int. Cl.
*G06F 3/041* (2006.01)
*G06F 1/16* (2006.01)

(52) U.S. Cl.
CPC ........ *G06F 3/04164* (2019.05); *G06F 1/1652* (2013.01); *G06F 3/0412* (2013.01); *G06F 2203/04102* (2013.01); *G06F 2203/04103* (2013.01)

(58) Field of Classification Search
CPC .. G06F 3/04164; G06F 3/0412; G06F 1/1652; G06F 2203/04102; G06F 2203/04103
USPC ........................................................ 345/173
See application file for complete search history.

(56) References Cited

U.S. PATENT DOCUMENTS

| | | | |
|---|---|---|---|
| 2008/0232047 A1* | 9/2008 | Yamada | G02F 1/13452 361/679.02 |
| 2014/0253830 A1 | 9/2014 | Li et al. | |
| 2014/0355227 A1* | 12/2014 | Lim | G02F 1/13452 361/749 |
| 2016/0117041 A1* | 4/2016 | Lee | G06F 3/04164 345/173 |
| 2016/0268524 A1* | 9/2016 | Suzuki | H04M 1/0268 |
| 2018/0004330 A1* | 1/2018 | Kim | H01L 27/3276 |
| 2019/0198801 A1* | 6/2019 | Kuon | H01L 51/5253 |
| 2019/0380197 A1* | 12/2019 | Lee | H05K 1/028 |
| 2021/0096721 A1* | 4/2021 | Beuker | G06F 3/0446 |

FOREIGN PATENT DOCUMENTS

| | | | | |
|---|---|---|---|---|
| CN | 108563363 B | | 2/2020 | |
| TW | M578418 | * | 5/2019 | ........... G06F 3/0412 |
| TW | M578418 U | | 5/2019 | |

* cited by examiner

*Primary Examiner* — Mark Edwards
(74) *Attorney, Agent, or Firm* — Cooper Legal Group, LLC (57) ABSTRACT

An electronic device includes a cover plate, a display module, and a touch module. The touch module includes a substrate, a touch sensing layer, and a trace. The substrate includes a main body portion and an extending portion connected to each other. The main body portion is located between the cover plate and the display module. The extending portion extends to a side of the display module away from the cover plate. The touch sensing layer is disposed on the main body portion. The trace is coupled to the touch sensing layer and extends on the extending portion.

20 Claims, 10 Drawing Sheets

ELECTRONIC DEVICE

BACKGROUND

Technical Field

The present disclosure relates to an electronic device.

Description of Related Art

At present, in the touch module industry, especially in the consumer sector, the border of the touch module has a trend of getting smaller and smaller. A narrow border can bring better display effects and more shocking appearance design, which can create greater product value for end customers.

However, the reduction of the border of the touch module is often limited by the capabilities of the touch sensing component. The traces of the touch sensing component must be reasonably laid out, while the trace width and gap must be minimized. After the traces are made narrower, the risk of disconnection often increases and the yield rate of touch sensing components decreases. Therefore, the traces of the touch sensing component cannot be reduced without limitation. In CN108563363B, a flexible printed circuit (FPC) with stable connectivity is bent by using glue. Although the yield rate of the narrow-border touch display module is improved, an additional FPC and a reserved bonding area must be used for bonding, which cannot achieve the effect of an extremely narrowed border.

Accordingly, how to provide an electronic device to solve the aforementioned problems becomes an important issue to be solved by those in the industry.

SUMMARY

An aspect of the disclosure is to provide an electronic device that can efficiently solve the aforementioned problems.

According to an embodiment of the disclosure, an electronic device includes a cover plate, a display module, and a touch module. The touch module includes a substrate, a touch sensing layer, and a trace. The substrate includes a main body portion and an extending portion connected to each other. The main body portion is located between the cover plate and the display module. The extending portion extends to a side of the display module away from the cover plate. The touch sensing layer is disposed on the main body portion. The trace is coupled to the touch sensing layer and extends on the extending portion.

In an embodiment of the disclosure, the electronic device further includes a main circuit board. The main circuit board is disposed at the side of the display module away from the cover plate and is electrically connected to the trace.

In an embodiment of the disclosure, the trace is bonded to the main circuit board.

In an embodiment of the disclosure, the trace is bonded to the main circuit board through a conductive adhesive.

In an embodiment of the disclosure, the electronic device further includes a flexible circuit board. The main circuit board is electrically connected to the trace via the flexible circuit board.

In an embodiment of the disclosure, the main circuit board includes an electrical connector. An end of the flexible circuit board is connected to the electrical connector. Another end of the flexible circuit board is bonded to the trace.

In an embodiment of the disclosure, the trace is bonded to the flexible circuit board through a conductive adhesive.

In an embodiment of the disclosure, the touch module further includes another touch sensing layer and another trace. The touch sensing layer and the another touch sensing layer are respectively disposed at opposite sides of the substrate. The another trace is coupled to the another touch sensing layer and extends on the extending portion. The trace and the another trace are respectively coupled to opposite sides of the main circuit board.

In an embodiment of the disclosure, the extending portion has a slot. The trace and the another trace are spaced apart from each other and respectively located at opposite sides of the slot.

In an embodiment of the disclosure, the electronic device further includes an adhesive member. The adhesive member is disposed at the side of the display module away from the cover plate and adhered to the extending portion.

In an embodiment of the disclosure, the extending portion crosses an edge of the display module and has a first end and a second end opposite to each other. The first end is connected to the main body portion. The second end is located at the side of the display module away from the cover plate. The second end is farther from the edge than the first end.

In an embodiment of the disclosure, a material of the substrate includes polyethylene terephthalate (PET).

Accordingly, in the electronic device of the present disclosure, by designing the extending portion of the substrate of the touch module to bend and extend to the side of the display module away from the cover plate, and designing the bonding area of the trace to extend on the extending portion on the side of the display module away from the cover plate, the border of the touch module can be effectively reduced, thereby increasing the flexibility of the design of the electronic device.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Figure 1:
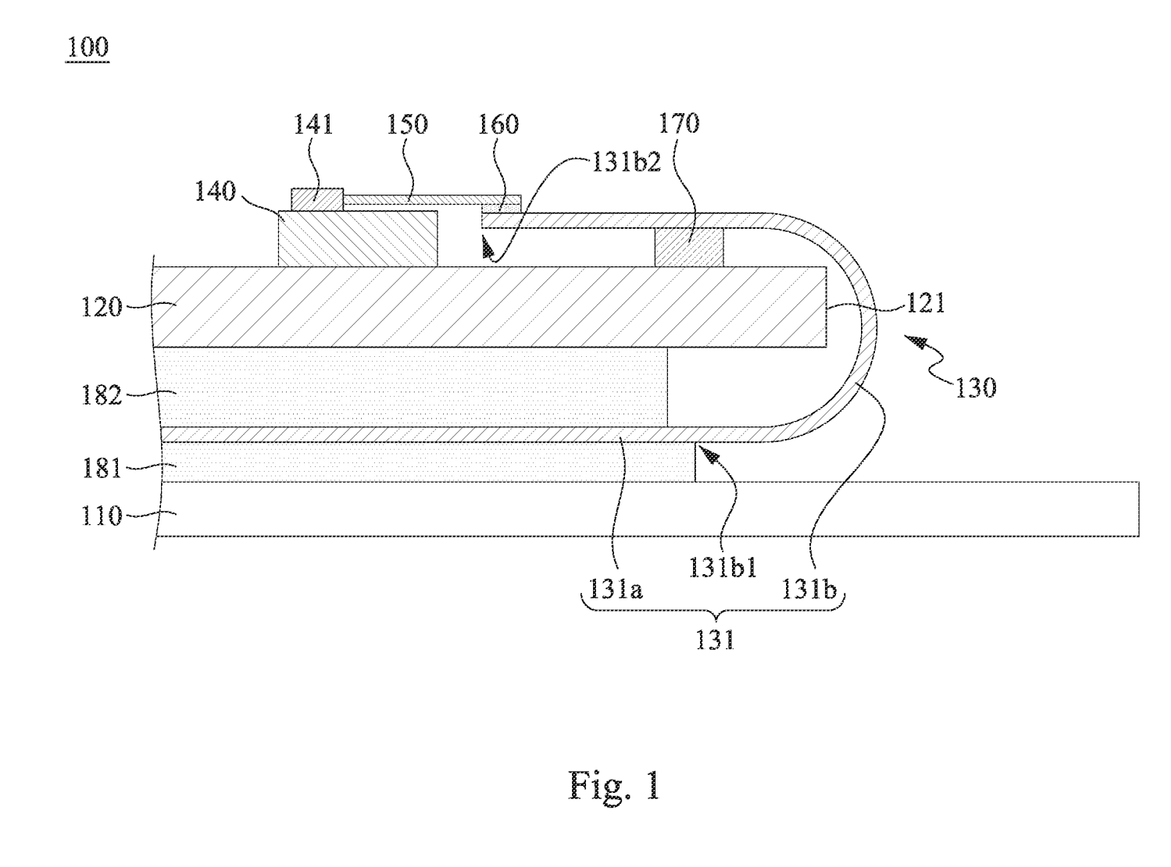
FIG. 1 is a cross-sectional view of an electronic device according to an embodiment of the disclosure.
Figure 2:
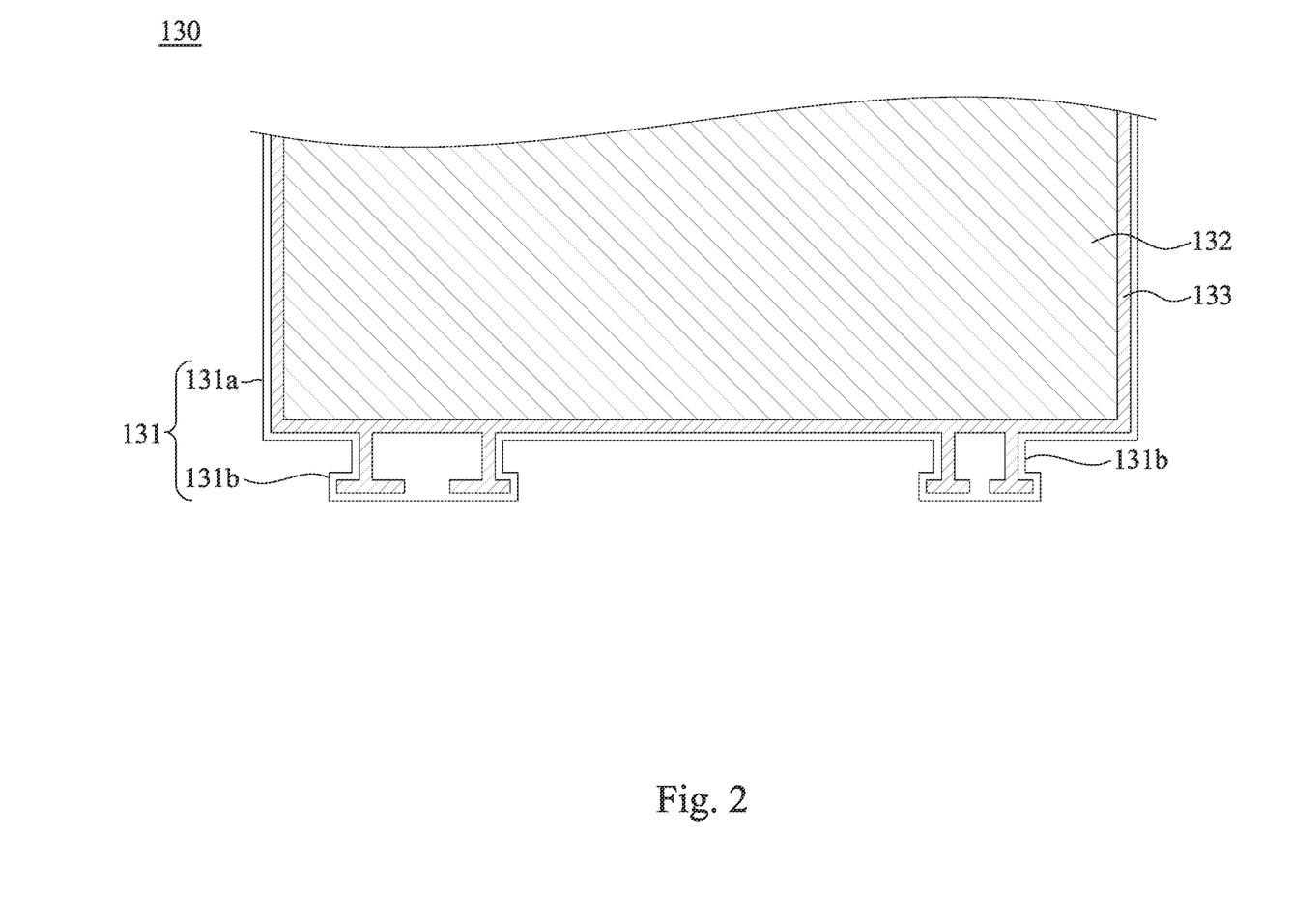
FIG. 2 is a partial top view of a touch module according to an embodiment of the disclosure.

Reference is made to FIGS. 1 and 2. FIG. 1 is a cross-sectional view of an electronic device 100 according to an embodiment of the disclosure. FIG. 2 is a partial top view of a touch module 130 according to an embodiment of the disclosure. As shown in FIGS. 1 and 2, in the present embodiment, the electronic device 100 includes a cover plate 110, a display module 120, and the touch module 130. The touch module 130 includes a substrate 131, a touch sensing layer 132, and a plurality of traces 133. The substrate 131 is partially located between the cover plate 110 and the display module 120 and partially located at a side of the display module 120 away from the cover plate 110. Specifically, the substrate 131 includes a main body portion 131a and an extending portion 131b connected to each other. The main body portion 131a is located between the cover plate 110 and the display module 120. The extending portion 131b extends to the side of the display module 120 away from the cover plate 110. The touch sensing layer 132 is disposed on the main body portion 131a. The traces 133 are coupled to the touch sensing layer 132 and extend on the extending portion 131b.

In some embodiments, the main body portion 131a of the substrate 131 defines thereon a touch area and a peripheral area surrounding the touch area. The touch module 130 includes two touch sensing layers 132. The two touch sensing layers 132 are disposed in the touch area. In some embodiments, one of the touch sensing layers 132 includes a plurality of first-axis conductive units (not shown) separated from each other, and another of the touch sensing layers 132 includes a plurality of second-axis conductive units (not shown) separated from each other and crossing the first-axis conductive units. The aforementioned "first-axis" and "second-axis" respectively are, for example, two axes (for example, the X axis and the Y axis) that are perpendicular to each other. In other words, the first-axis conductive units are conductive lines extending along the first axis, and the second-axis conductive units are conductive lines extending along the second axis.

In some embodiments, the second-axis conductive units cross the first-axis conductive units from above, and an insulating layer (not shown) electrically insulates the first-axis conductive units from the second-axis conductive units at least at the intersections between the first-axis conductive units and the second-axis conductive units. It can be seen that the two touch sensing layers 132 are separated by the insulating layer to form a structure similar to a bridge. Therefore, the touch module 130 of the present embodiment is an OGS (One Glass Solution) type touch module, but the disclosure is not limited in this regard.

In some embodiments, as shown in FIG. 1, the electronic device 100 further includes adhesive layers 181, 182. The main body portion 131a of the touch module 130 is adhered to the cover plate 110 through the adhesive layer 181 and adhered to the display module 120 through the adhesive layer 182.

In some embodiments, the adhesive layers 181, 182 are optically clear adhesive (OCA), but the disclosure is not limited in this regard.

In some embodiments, as shown in FIG. 2, the traces 133 extend from the peripheral area of the main body portion 131a of the substrate 131 to the extending portion 131b. Each of the traces 133 is coupled to the corresponding first-axis conductive unit or second-axis conductive unit, so as to transmit the signal sensed by the corresponding first-axis conductive unit or second-axis conductive unit.

In some embodiments, as shown in FIG. 1, the electronic device 100 further includes a main circuit board 140. The main circuit board 140 is disposed at the side of the display module 120 away from the cover plate 110 and is at least configured to control the display of the display module 120. The main circuit board 140 is electrically connected to the traces 133 extending on the extending portion 131b.

In some embodiments, as shown in FIG. 1, the electronic device 100 further includes a flexible circuit board 150. The main circuit board 140 is electrically connected to the traces 133 extending on the extending portion 131b via the flexible circuit board 150. Specifically, the main circuit board 140 includes an electrical connector 141. An end of the flexible circuit board 150 is connected to the electrical connector 141. Another end of the flexible circuit board 150 is bonded to the traces 133 extending on the extending portion 131b.

In some embodiments, the traces 133 are bonded to the flexible circuit board 150 through a conductive adhesive 160. In some embodiments, the conductive adhesive 160 is an anisotropic conductive film (ACF), but the disclosure is not limited in this regard.

With the aforementioned structural configuration (that is, the bonding area of the traces 133 extending on the extending portion 131b is disposed on the side of the display module 120 away from the cover plate 110), the border of the touch module 130 can be effectively reduced, thereby increasing the flexibility of the design of the electronic device 100.

In some embodiments, as shown in FIG. 1, the electronic device 100 further includes an adhesive member 170. The adhesive member 170 is disposed at the side of the display module 120 away from the cover plate 110 and adhered to the extending portion 131b. Hence, the part of the extending portion 131b that is bent to the side of the display module 120 away from the cover plate 110 can be more firmly fixed to the display module 120, thereby improving the reliability of the electrical connection between the main circuit board 140 and the traces 133 via the flexible circuit board 150.

In some embodiments, as shown in FIG. 1, the extending portion 131b of the substrate 131 crosses an edge 121 of the display module 120 and has a first end 131b1 and a second end 131b2 opposite to each other. The first end 131b1 is connected to the main body portion 131a. The second end 131b2 is located at the side of the display module 120 away from the cover plate 110. The second end 131b2 is farther from the edge 121 than the first end 131b1. This structural configuration can cause the bonding area of the traces 133 on the extending portion 131b to be far away from the bending portion of the extending portion 131b. Hence, the problem of the second end 131b2 of the extending portion 131b being warped relative to the side of the display module 120 away from the cover plate 110 due to the stress generated by the bending can be effectively avoided.

In some embodiments, the radius of curvature of the bending portion of the extending portion 131b is about 0.5 mm to 1.5 mm (preferably about 1.0 mm), but the disclosure is not limited in this regard.

In some embodiments, a material of the substrate 131 includes polyethylene terephthalate (PET), but the disclosure is not limited in this regard.

In some embodiments, a material of the cover plate 110 includes glass or a flexible polymer material, but the disclosure is not limited in this regard.

In some embodiments, at least one of the two touch sensing layers 132 can be a silver nanowire electrode layer, a metal grid, or can include an indium tin oxide (ITO) electrode layer, but the disclosure is not limited in this regard.

In some embodiments, the display module 120 is a liquid crystal display (LCD), but the disclosure is not limited in this regard.

Figure 3:
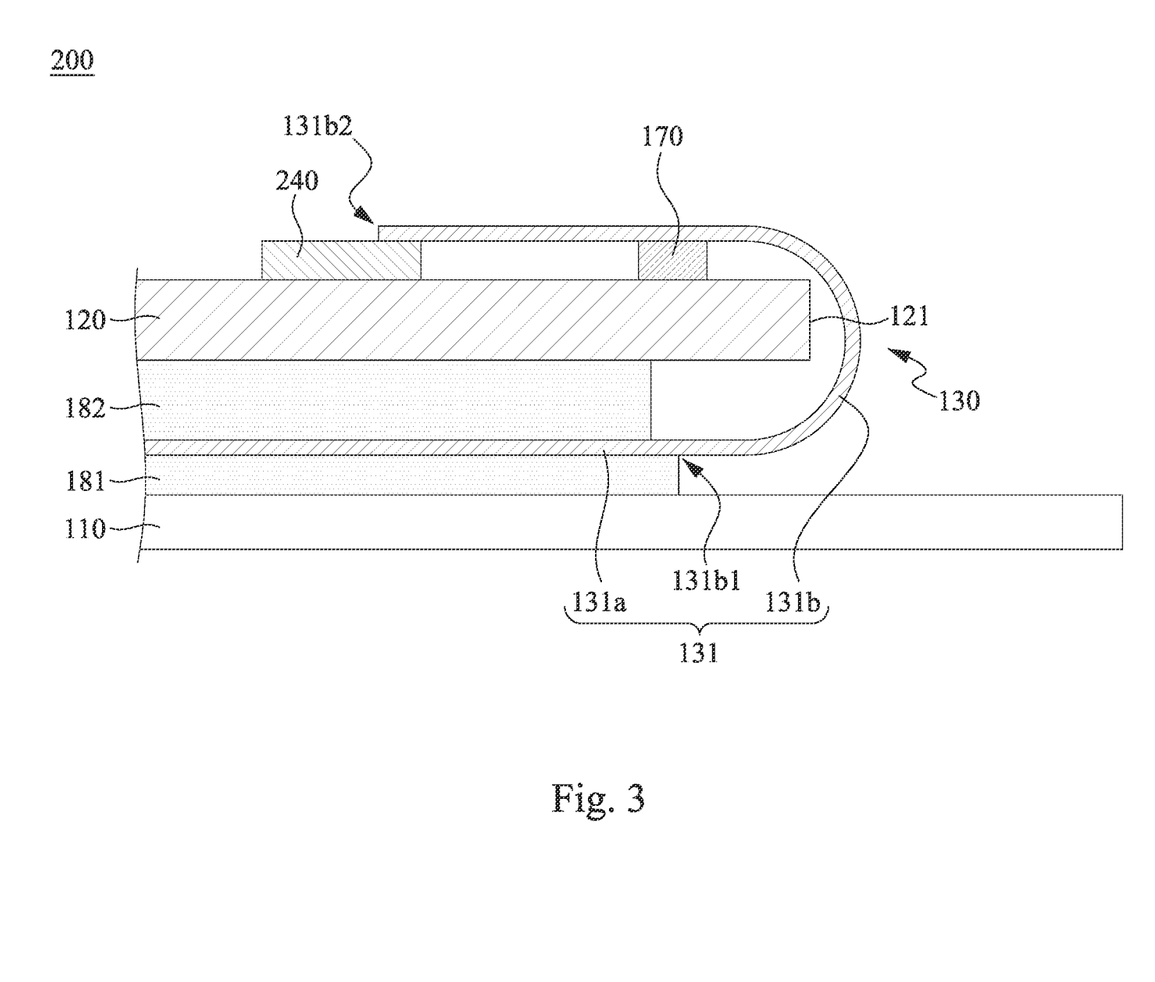
FIG. 3 is a cross-sectional view of an electronic device according to another embodiment of the disclosure.

Reference is made to FIG. 3. FIG. 3 is a cross-sectional view of an electronic device 200 according to another embodiment of the disclosure. As shown in FIG. 3, the electronic device 200 includes a cover plate 110, a display module 120, a touch module 130, a main circuit board 240, and an adhesive member 170, in which the cover plate 110, the display module 120, the touch module 130, and the adhesive member 170 are the same as or similar to the embodiment shown in FIG. 1. Therefore, reference may be made to the aforementioned related descriptions and will not be repeated here.

One difference between the present embodiment and the embodiment shown in FIG. 1 is that the main circuit board 240 of the present embodiment does not include the electrical connector 141, the flexible circuit board 150 shown in FIG. 1. Another difference between the present embodiment and the embodiment shown in FIG. 1 is that the traces 133 extending on the extending portion 131b in the present embodiment are connected to the main circuit board 240. In other words, the traces 133 extending on the extending portion 131b in the present embodiment are directly connected to the main circuit board 240. Hence, compared with the embodiment shown in FIG. 1, the number of connection elements can be further reduced, and the reliability of the electrical connection can be further improved.

Figure 4:
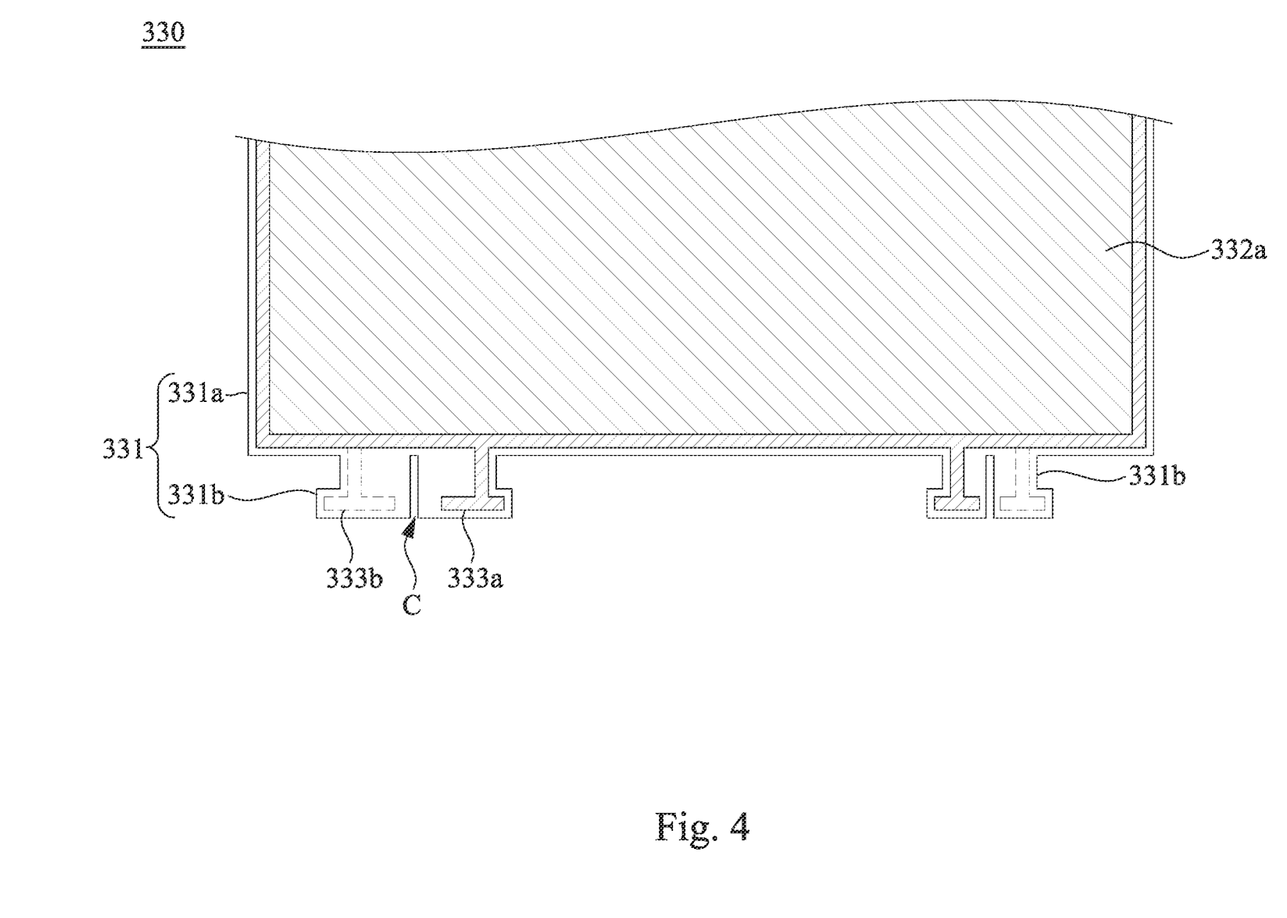
FIG. 4 is a partial top view of a touch module according to another embodiment of the disclosure.
Figure 5:
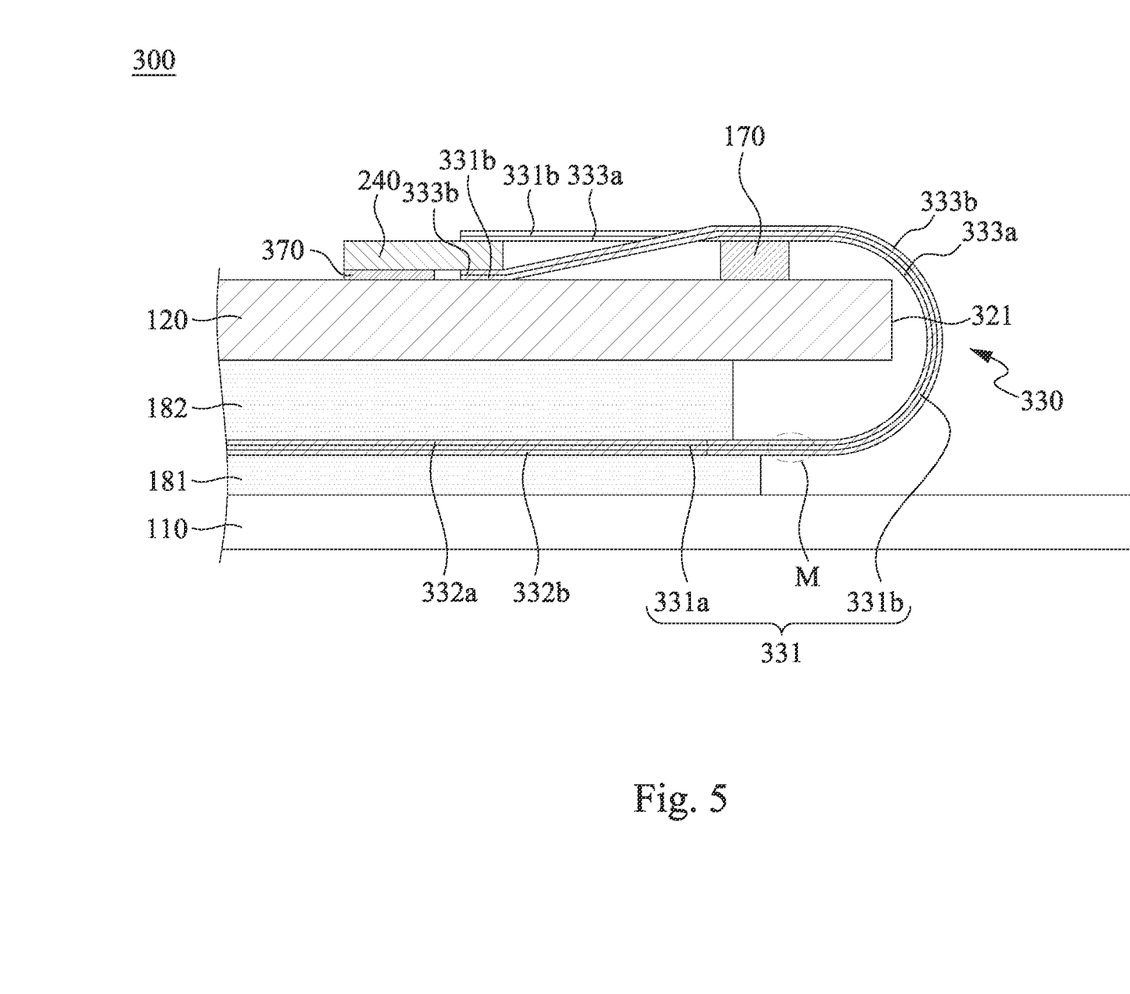
FIG. 5 is a cross-sectional view of an electronic device adopting the touch module shown in FIG. 4.

Reference is made to FIGS. 4 and 5. FIG. 4 is a partial top view of a touch module 330 according to another embodiment of the disclosure. FIG. 5 is a cross-sectional view of an electronic device 300 adopting the touch module 330 shown in FIG. 4. The present embodiment is modified from the touch module 130 shown in FIG. 3, so other components with the same reference numbers have the same or similar structures and functions and will not be repeated here. Specifically, the touch module 330 includes a substrate 331, touch sensing layers 332a, 332b, and a plurality of traces 333a, 333b. The substrate 331 includes a main body portion 331a and an extending portion 331b connected to each other. The main body portion 331a is located between the cover plate 110 and the display module 120. The extending portion 331b extends to the side of the display module 120 away from the cover plate 110. The touch sensing layers 332a, 332b are respectively disposed on opposite sides of the main body portion 331a. The traces 333a, 333b are respectively coupled to the touch sensing layers 332a, 332b and extend on the extending portion 331b.

In addition, as shown in FIG. 4, the extending portion 331b has a slot C. The traces 333a, 333b are spaced apart from each other and respectively located at opposite sides of the slot C. Hence, as shown in FIG. 5, the traces 333a, 333b are respectively coupled to opposite sides of the main circuit board 240. Specifically, part of the extending portion 331b and the traces 333b protrude between the display module 120 and the main circuit board 240. In order to maintain the flatness of the main circuit board 240 disposed on the display module 120, the electronic device 300 may further include another adhesive member 370 bonded between the display module 120 and the main circuit board 240. The thickness of the adhesive member 370 is the same or similar to the sum of the thickness of the extending portion 331b and the thickness of the traces 333b.

Figure 6:
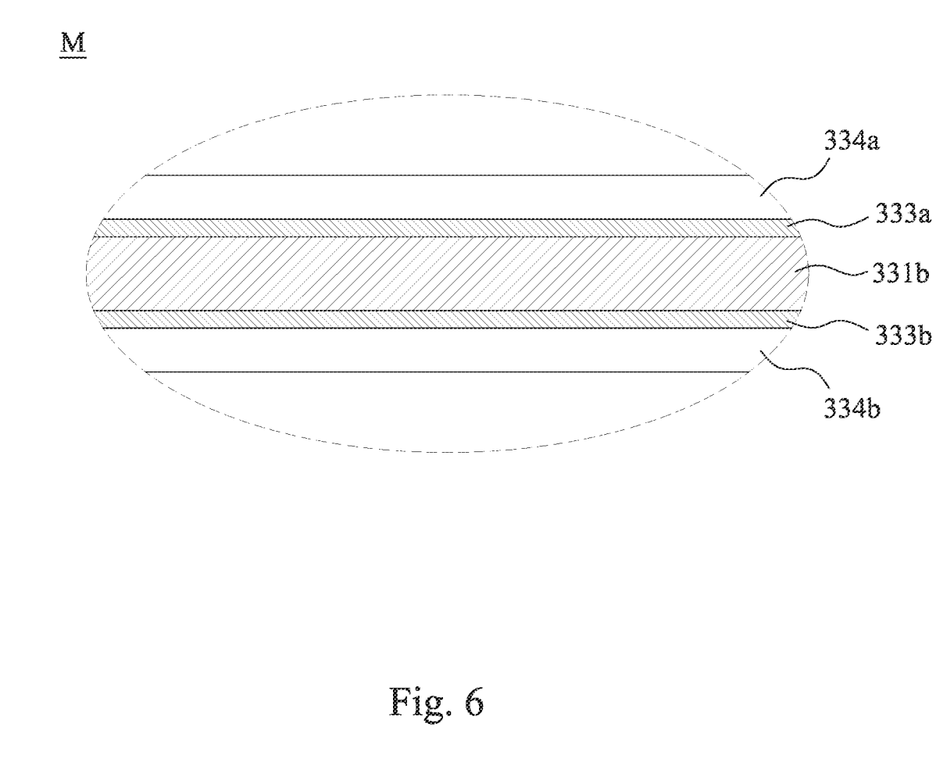
FIG. 6 is a partial enlarged view of FIG. 5.

Reference is made to FIG. 6. FIG. 6 is a partial enlarged view of a region M in FIG. 5. As shown in FIG. 6, in the present embodiment, the touch module 330 further includes protective layers 334a, 334b. The protective layers 334a, 334b are respectively disposed at opposite sides of the extending portion 331b of the substrate 331 and respectively cover the traces 333a, 333b, so as to protect the traces 333a, 333b. In some embodiments, the substrate 331 has a thickness of about 30 μm to about 50 μm (preferably about 38 μm), but the disclosure is not limited in this regard. In some embodiments, each of the touch sensing layers 332a, 332b has a thickness of about 0.5 μm to 1.5 μm (preferably about 1.0 μm), but the disclosure is not limited in this regard. In some embodiments, each of the protective layers 334a, 334b has a thickness of about 8 μm to 12 μm (preferably about 10 μm), but the disclosure is not limited in this regard.

Reference is made to FIGS. 7A to 7D. FIGS. 7A to 7D are schematic diagrams showing different intermediate stages of manufacturing the electronic device 100.

Figure 7A:
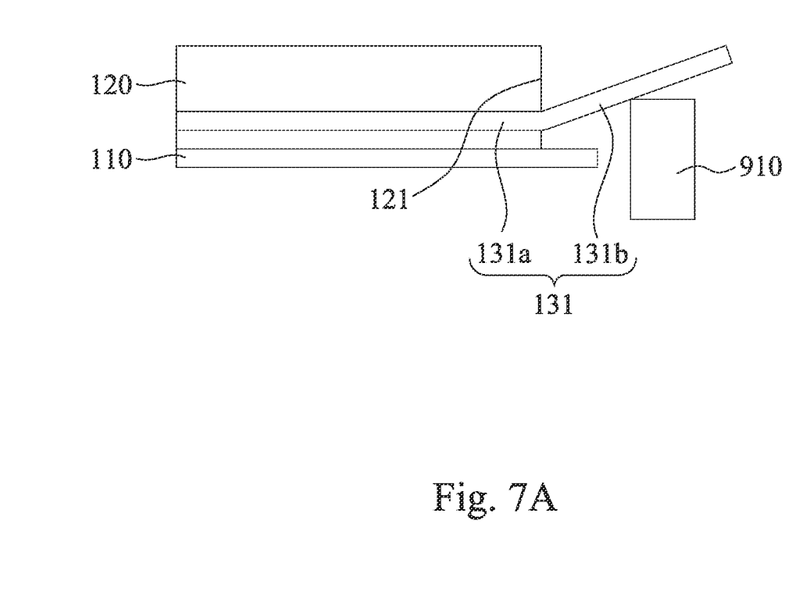
FIG. 7A is a schematic diagram showing an intermediate stage of manufacturing an electronic device.

As shown in FIG. 7A, after the main body portion 131a of the substrate 131 of the touch module 130 has been disposed between the cover plate 110 and the display module 120, the combination of the cover plate 110, the touch module 130, and the display module 120 can be placed on a fixture (not shown), and a lifting pillar 910 can be used to lift the extending portion 131b of the substrate 131 upward relative to the main body portion 131a from bottom to top.

Figure 7B:
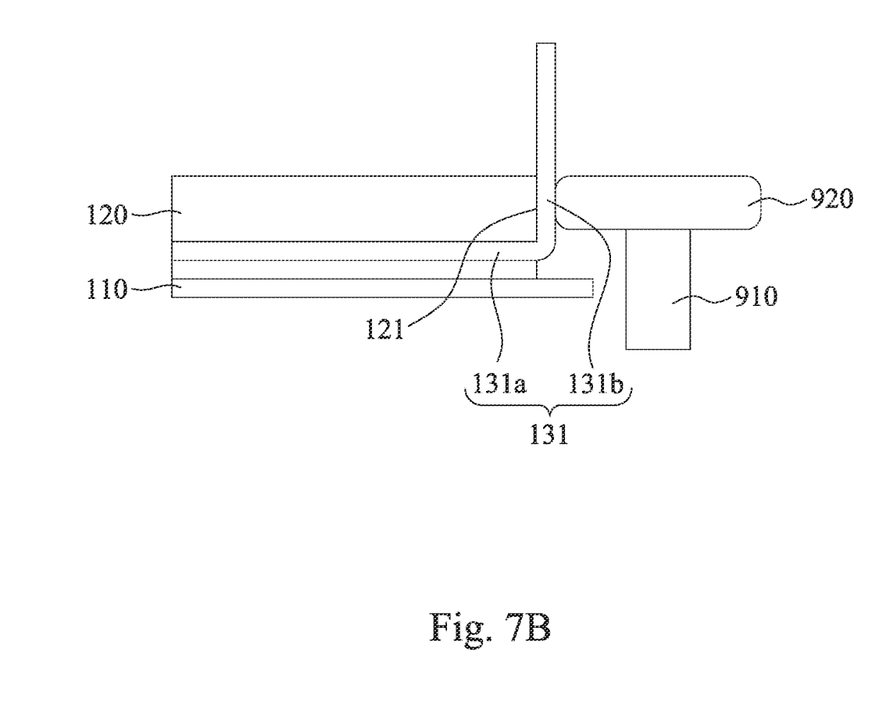
FIG. 7B is a schematic diagram showing an intermediate stage of manufacturing the electronic device.

As shown in FIG. 7B, after the lifting pillar 910 is used to lift the extending portion 131b of the substrate 131 upward relative to the main body portion 131a, a pushing block 920 can be used to push the extending portion 131b toward the edge 121 of the display module 120 from right to left, thereby increasing the amount of warpage of the extending portion 131b relative to the main body portion 131a. Not only that, this step can also make the bending portion of the extending portion 131b be closer to the edge 121 of the display module 120, thereby effectively reducing the border of the touch module 130.

Figure 7C:
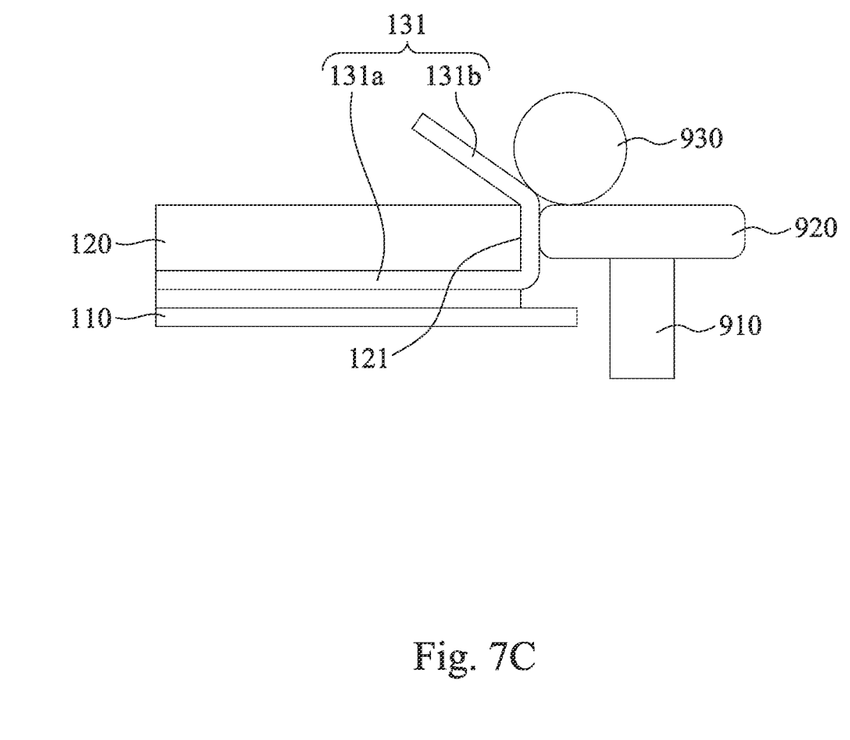
FIG. 7C is a schematic diagram showing an intermediate stage of manufacturing the electronic device.
Figure 7D:
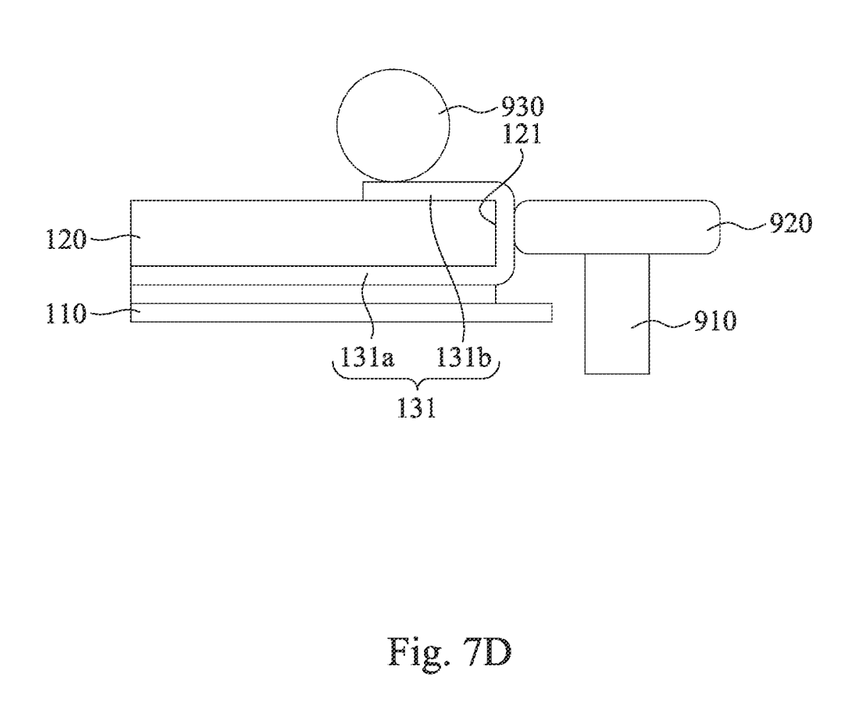
FIG. 7D is a schematic diagram showing an intermediate stage of manufacturing the electronic device.

As shown in FIGS. 7C and 7D, after the extending portion 131b is pushed toward the edge 121 of the display module 120 by the pushing block 920, a roller 930 can be used to roll the extending portion 131b toward the side of the display module 120 away from the cover plate 110, so that the extending portion 131b is stacked and fixed (for example, through the adhesive member 170 shown in FIG. 1) to the display module 120. In order to allow the roller 930 to smoothly roll the extending portion 131b to the display module 120, the top surface of the pushing block 920 pressing the extending portion 131b can be flush with the surface of the display module 120 away from the cover plate 110.

Taking the embodiment shown in FIG. 1 as an example, after the extending portion 131b is rolled toward the display module 120 by the roller 930, one end of the flexible circuit board 150 can be bonded to the traces 133 extending on the extending portion 131*b* (through the conductive adhesive 160), and another end of the flexible circuit board 150 can be plugged into the electrical connector 141 on the main circuit board 140. It should be noted that the step of installing the main circuit board 140 on the display module 120 may be performed before or after the step of fixing the flexible circuit board 150 and the main circuit board 140. However, compared with the former approach (that is, the main circuit board 140 is fixed first and then the flexible circuit board 150 is connected), the latter approach (that is, the flexible circuit board 150 is connected first and then the main circuit board 140 is fixed) can effectively avoid the problem of the flexible circuit board 150 arching due to length error.

According to the foregoing recitations of the embodiments of the disclosure, it can be seen that in the electronic device of the present disclosure, by designing the extending portion of the substrate of the touch module to bend and extend to the side of the display module away from the cover plate, and designing the bonding area of the trace to extend on the extending portion on the side of the display module away from the cover plate, the border of the touch module can be effectively reduced, thereby increasing the flexibility of the design of the electronic device.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An electronic device, comprising:
a cover plate;
a display module;
a touch module comprising:
a substrate comprising a main body portion and an extending portion connected to each other, the main body portion being located between the cover plate and the display module, the extending portion extending to a side of the display module away from the cover plate, wherein a first surface of the substrate is non-jagged from the main body portion to the side of the display module away from the cover plate;
a first touch sensing layer disposed on the main body portion;
a first trace coupled to the first touch sensing layer and extending on the extending portion;
a second touch sensing layer disposed on the main body portion, wherein the first touch sensing layer and the second touch sensing layer are disposed at opposite sides of the substrate; and
a second trace coupled to the second touch sensing layer and extending on the extending portion; and
a main circuit board disposed at the side of the display module away from the cover plate and electrically connected to the first trace, wherein the first trace and the second trace are coupled to opposite sides of the main circuit board.

2. The electronic device of claim 1, wherein the first trace is bonded to the main circuit board.

3. The electronic device of claim 1, wherein the first trace is bonded to the main circuit board through a conductive adhesive.

4. The electronic device of claim 1, further comprising a flexible circuit board, wherein the main circuit board is electrically connected to the first trace via the flexible circuit board.

5. The electronic device of claim 4, wherein the main circuit board comprises an electrical connector, an end of the flexible circuit board is connected to the electrical connector, and another end of the flexible circuit board is bonded to the first trace.

6. The electronic device of claim 5, wherein the first trace is bonded to the flexible circuit board through a conductive adhesive.

7. The electronic device of claim 1, wherein the extending portion has a slot, and the first trace and the second trace are spaced apart from each other and disposed at opposite sides of the slot.

8. The electronic device of claim 1, further comprising an adhesive member disposed at the side of the display module away from the cover plate and adhered to the extending portion.

9. The electronic device of claim 1, wherein the extending portion crosses an edge of the display module and has a first end and a second end opposite to each other, the first end is connected to the main body portion, the second end is located at the side of the display module away from the cover plate, and the second end is farther from the edge than the first end.

10. The electronic device of claim 1, wherein a material of the substrate comprises polyethylene terephthalate (PET).

11. The electronic device of claim 1, wherein a radius of curvature of a bending portion of the extending portion is 0.5 mm to 1.5 mm.

12. The electronic device of claim 1, comprising:
an adhesive member located between the display module and the main circuit board, wherein a combined thickness of the first trace and the extending portion is equal to a thickness of the adhesive member.

13. An electronic device, comprising:
a cover plate;
a display module;
a touch module comprising:
a substrate comprising a main body portion and an extending portion connected to each other, the main body portion being located between the cover plate and the display module, the extending portion extending to a side of the display module away from the cover plate, the main body portion and the extending portion have a homogenous composition;
a first touch sensing layer disposed on the main body portion;
a first trace coupled to the first touch sensing layer and extending on the extending portion;
a second touch sensing layer disposed on the main body portion, wherein the first touch sensing layer and the second touch sensing layer are disposed at opposite sides of the substrate; and
a second trace coupled to the second touch sensing layer and extending on the extending portion; and
a main circuit board disposed at the side of the display module away from the cover plate and electrically connected to the first trace, wherein the first trace and the second trace are coupled to opposite sides of the main circuit board.

14. The electronic device of claim 13, wherein the first trace is located between the main circuit board and the display module.

15. An electronic device, comprising:
a cover plate;
a display module;
a touch module comprising:
  a substrate comprising a main body portion and an extending portion connected to each other, the main body portion being located between the cover plate and the display module, the extending portion extending to a side of the display module away from the cover plate;
  a first touch sensing layer disposed on the main body portion;
  a first trace coupled to the first touch sensing layer and extending on the extending portion;
  a second touch sensing layer, wherein the first touch sensing layer and the second touch sensing layer are disposed at opposite sides of the substrate; and
  a second trace coupled to the second touch sensing layer and extending on the extending portion; and
a main circuit board disposed at the side of the display module away from the cover plate and electrically connected to the first trace, wherein the first trace and the second trace are coupled to opposite sides of the main circuit board.

16. The electronic device of claim 15, wherein the extending portion has a slot, and the first trace and the second trace are spaced apart from each other and respectively located at opposite sides of the slot.

17. The electronic device of claim 15, wherein one of the first trace or the second trace is disposed between the display module and the main circuit board.

18. The electronic device of claim 15, wherein:
the first trace and a first portion of the extending portion are located between the main circuit board and the display module, and
the second trace and a second portion of the extending portion are located at an opposite side of the main circuit board relative to the first trace and the first portion of the extending portion.

19. The electronic device of claim 15, wherein:
the extending portion extends outwardly from the main body portion in a first direction,
the extending portion has a first width measured in a second direction perpendicular to the first direction,
the main body portion has a second width measured in the second direction, and
the first width is less than the second width.

20. The electronic device of claim 1, wherein:
the extending portion extends outwardly from the main body portion in a first direction,
the extending portion has a first width measured in a second direction perpendicular to the first direction,
the main body portion has a second width measured in the second direction, and
the first width is less than the second width.

\* \* \* \* \*